(12) United States Patent
Haas et al.

(10) Patent No.: US 9,616,531 B2
(45) Date of Patent: Apr. 11, 2017

(54) APPARATUS AND METHOD FOR PRODUCING WAFER BLOCKS

(75) Inventors: Johannes Haas, Vienna (AT); Josef Haas, Leobendorf (AT); Karl Haderer, Ziersdorf (AT); Stefan Jiraschek, Koenigsbrunn (AT); Juergen Reithner, Schoenberg am Kamp (AT); Leopold Schiessbuehl, Goellersdorf (AT); Gerhard Schuhleitner, Limberg (AT)

(73) Assignee: Haas Food Equipment GmbH, Vienna (AT)

( * ) Notice: Subject to any disclaimer, the term of this patent is extended or adjusted under 35 U.S.C. 154(b) by 614 days.

(21) Appl. No.: 14/116,803

(22) PCT Filed: May 8, 2012

(86) PCT No.: PCT/EP2012/058410
§ 371 (c)(1),
(2), (4) Date: Dec. 17, 2013

(87) PCT Pub. No.: WO2012/152776
PCT Pub. Date: Nov. 15, 2012

(65) Prior Publication Data
US 2014/0090227 A1 Apr. 3, 2014

(30) Foreign Application Priority Data
May 11, 2011 (AT) .................................. A668/2011

(51) Int. Cl.
*A21C 15/02* (2006.01)
*B23P 19/04* (2006.01)
*A23G 9/28* (2006.01)
*B65G 57/30* (2006.01)

(52) U.S. Cl.
CPC .............. *B23P 19/04* (2013.01); *A21C 15/02* (2013.01); *A23G 9/286* (2013.01); *B65G 57/301* (2013.01); *Y10T 29/49826* (2015.01)

(58) Field of Classification Search
CPC ........ A21C 15/02; A21C 15/007; A23G 9/286
USPC .......... 99/450.4, 450.5, 450, 7; 425/40, 145, 425/207, 308; 198/339.1, 418.4, 434
See application file for complete search history.

(56) References Cited

U.S. PATENT DOCUMENTS

| 5,012,726 A | * | 5/1991 | Fehr | ....................... | A21C 9/063 |
| | | | | | 99/450.6 |
| 5,528,983 A | * | 6/1996 | Carter | ..................... | A21C 15/02 |
| | | | | | 99/450.4 |

(Continued)

FOREIGN PATENT DOCUMENTS

FR 1440310 A 5/1966

*Primary Examiner* — Reginald Alexander
(74) *Attorney, Agent, or Firm* — Laurence A. Greenberg; Werner H. Stemer; Ralph E. Locher

(57) ABSTRACT

An apparatus and a method produce multi-layered wafer blocks which are filled with a spreading substance such as a cream, for example, in which a first wafer block component is transported along a conveying surface to a stacking area, is lifted there from the conveying surface by a gripping device, a second wafer block component is subsequently or simultaneously transported along the conveying surface to the stacking area, and the first wafer block component is placed and/or pressed onto the second wafer block component from above in a joining process.

7 Claims, 11 Drawing Sheets

(56) References Cited

U.S. PATENT DOCUMENTS

| | | | |
|---|---|---|---|
| 5,865,106 A * | 2/1999 | van der Ent | A21C 15/002 |
| | | | 99/450.1 |
| 6,190,714 B1 | 2/2001 | Haas et al. | |
| 9,010,239 B2 * | 4/2015 | Haas | A21C 15/02 |
| | | | 99/450.4 |
| 2005/0244560 A1 | 11/2005 | Schultz | |
| 2008/0032012 A1 | 2/2008 | Draganitsch et al. | |

* cited by examiner

APPARATUS AND METHOD FOR PRODUCING WAFER BLOCKS

BACKGROUND OF THE INVENTION

Field of the Invention

The invention relates to an apparatus and a method for producing multilayer wafer blocks filled with a coating mass such as, for example, a cream, in which a first wafer block component is transported along a conveying surface to a stacking area, is there raised from the conveying surface by a gripping device, where a second wafer block component is transported subsequently or simultaneously along the conveying surface to the stacking area.

Methods and apparatus for producing multilayer wafer blocks filled with cream have been known for a long time and published in various embodiments.

For example, a method is known in which cream-coated wafer sheets are transported in a first level to a stacking site, there raised into a second level and joined from below onto the already-raised part of the wafer block, where each coated wafer sheet is initially pushed below the part of the wafer block held in the raised position and then raised, and the wafer block thus formed is removed from the stacking site in the raised position.

Stacking and pressing devices to product wafer blocks corresponding to the prior art usually have a stop disposed along the conveying surface of the supplied wafer sheets, at which the moving wafer sheets are stopped and are supplied to further wafer sheets for the purpose of stacking. Modern wafer baking ovens and modern coating machines for creams and other coating masses are adapted to produce or to coat high throughputs of 60 to 100 wafer sheets per minute. The usual size of the wafer sheets is up to about 400 mm×800 mm. For processing such quantities in a short time, it is necessary to configure the stacking of the individual coated or uncoated wafer sheets as efficiently as possible without thereby adversely affecting the quality of the finished product.

A disadvantage with the designs corresponding to the prior art is that the wafer sheets must be stopped, stacked and accelerated again in the stacking area. As a result of the low resistance of wafer sheets, in particular crispy brittle flat wafers which are baked in wafer baking ovens with closable baking tongs at high pressure and high temperature, the wafer sheets cannot be arbitrarily accelerated or braked since otherwise structural damage, in particular breakages, damage to the sheet edge and other damage can occur. Such damaged wafer blocks, for example, with broken edges or cracks in the wafer sheets must be sorted out after the production process and separated as wastage. A further disadvantage of the methods of manufacture and its apparatus corresponding to the prior art is that the precision during the stacking process, in particular the exact congruent positioning of the wafer sheets above one another is not sufficiently given. As a result, partial overlaps or protruding individual wafer sheets occur in the edge zone. The edge must be processed subsequently or trimmed which again involves fairly high wastage.

BRIEF SUMMARY OF THE INVENTION

It is now the object of the following invention to provide a method and an apparatus for producing multilayer wafer blocks filled with a coating mass, for example, a cream, which allows a high throughput, in particular a plurality of wafer blocks can be produced in a short time, and at the same time meets the high demands for the quality and furthermore minimises wastage, is simple and favourable to produce and is efficient to maintain and operate.

The wafers preferably comprise flat wafers. Apparatus and methods are known for producing the wafer sheets, for example, in which wafer sheets, in particular crispy brittle flat wafers are baked in tong automatic baking machines where the wafer sheets are baked at high pressure in closed and locked wafer tongs and then cooled. The wafer sheets are preferably thin-walled, crispy brittle wafers having a size of up to 400×800 mm. These wafers are for example used to form slice blocks which have a layered structure, for example, comprising alternate layers of wafer sheets and cream fillings. Slice blocks can, for example, consist of two wafer sheets with an interposed cream layer, of two wafer sheets with a plurality of interposed cream layers but also can consist of a structure of more than two wafer sheet layers, where one or more cream layers are disposed between two wafer sheets. In most cases the slice blocks have respectively one wafer sheet on two exterior surfaces. The terminating layers are therefore designed as wafer sheets.

It is the object of the present invention to now provide a method and an apparatus for producing multilayer wafer blocks filled with a coating mass where a high throughput is achieved, the wafer block components are positioned exactly above one another, the wafer block components are processed as gently as possible and where the apparatus is favourable to produce and favourable to maintain.

The object according to the invention is solved whereby the first wafer block component is placed and/or pressed onto the second wafer block component from above in a joining process.

The present invention is further characterised in that the first wafer block component and the second wafer block component have the same speed in the conveying direction at each time point of the joining process, where the speed is non-zero, that the first wafer block component is raised from the conveying surface by a gripping device in a front position in the conveying direction and is placed on a following wafer block component in a rear position in the conveying direction and that the first wafer block component and the second wafer block component are raised jointly by the gripping device from the conveying surface in a front position in the conveying direction and are placed on a following wafer block component in a rear position in the conveying direction. The method is advantageously characterised in that the wafer block components are transported by a first transport device into the stacking area, that the first wafer block component is formed from two wafer sheets lying congruently and parallel one above the other, wherein at least one layer of a coating mass such as, for example, a cream is provided between the wafer sheets and that the second wafer block component is formed from a wafer sheet which has a layer of a coating mass such as, for example, a cream on a flat side, preferably on the side facing the gripper.

On the apparatus according to the invention for producing multilayer wafer blocks filled with a coating mass such as, for example, a cream, comprising a first transport device for transporting the wafer block components along the conveying surface in the conveying direction and a gripping device for stacking the wafer block components, it is advantageous that the gripping device comprises a gripper which is disposed movably at least in sections along the conveying surface, that the gripper is movable at least along two translational degrees of freedom, that at least one gripping arm is provided for movement of the gripper (5) and that the gripping arms each have at least one drive.

Furthermore, it corresponds to the inventive idea that a counter-holder is provided, that the counter-holder is disposed displaceably along the conveying surface in and contrary to the conveying direction and that the gripper is disposed displaceably substantially normal to the counter-holder.

Furthermore, it should be noted in a positive manner that the gripper is disposed displaceably in a translational manner substantially parallel to the counter-holder and the gripper is designed as a vacuum plate and has openings which can be closed at least partially by a first wafer block component.

The invention is described in detail hereinafter with reference to some exemplary embodiments.

DESCRIPTION OF THE INVENTION

Figure 1:
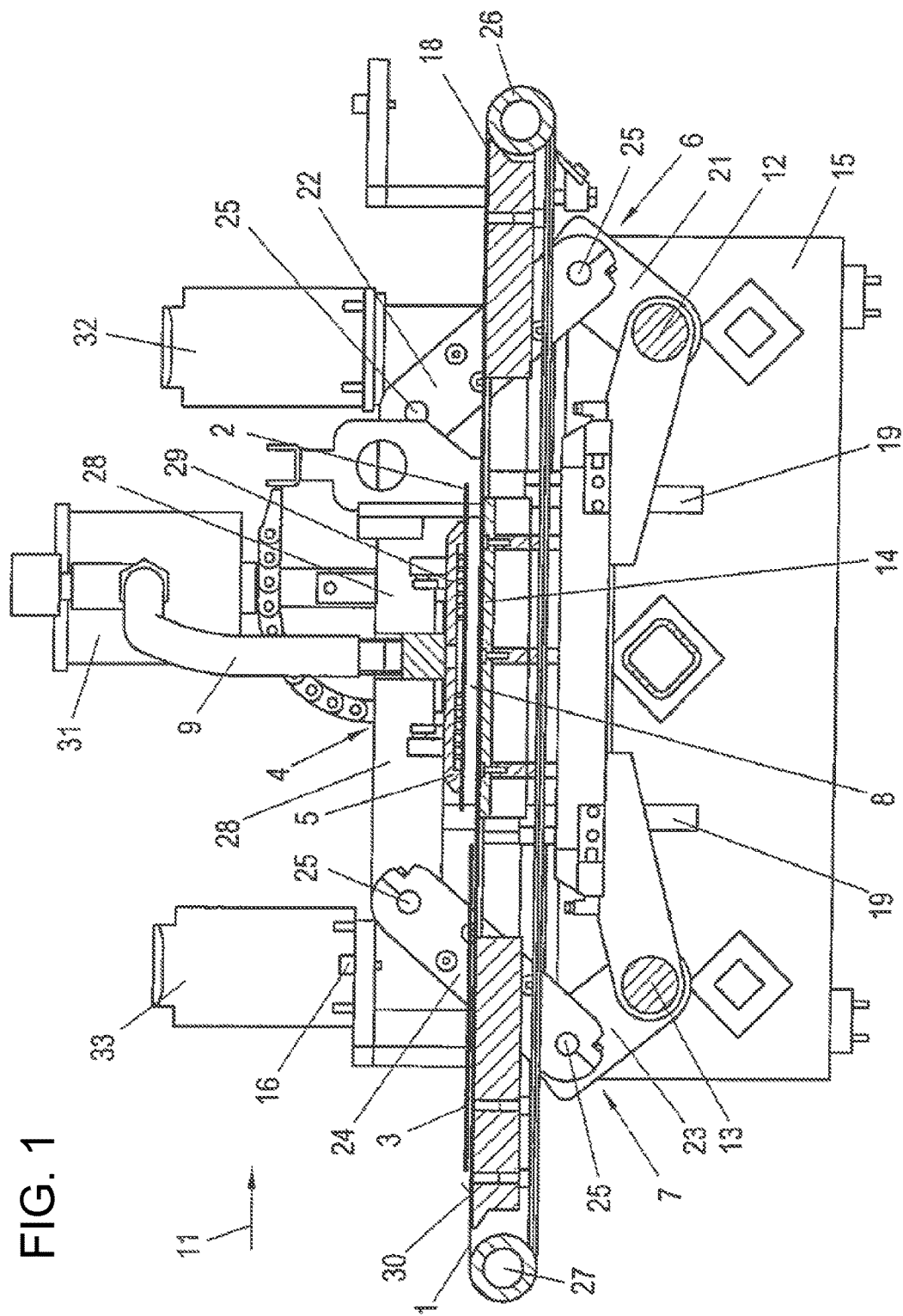
FIG. 1 is a diagrammatic, longitudinal-sectional view of an apparatus for producing wafer blocks, according to the invention.

FIG. 1 shows an apparatus according to the invention in a schematic sectional view comprising a first transport device 1 on which the wafer block components are transported along the conveying surface 30 in the direction of the stacking area 8. Located in the stacking area 8 is a movable gripping device 4 which takes over substantial parts of the method such as, for example, stacking, pressing, raising, lowering etc. The gripping device 4 comprises a gripper 5. In the present embodiment this is designed as a vacuum plate and on its side facing away from the first transport device 1 has a vacuum line 9, a vacuum pump 10 and an air filter 31 for protection of the vacuum pump 10. On the side facing the first transport device the gripper 5 has openings or cavities which can be closed at least partially by the sucked-on wafer sheet or the sucked-on first wafer block component 2. A vacuum can be built up by closing the openings, which vacuum holds the wafer sheet or the wafer block component on the gripper 5 with a holding force.

Furthermore, the gripping device 4 has a base body 28 which is connected to the gripper 5. The gripping arms, in particular the front gripping arm 6 and the rear gripping arm 7 are movably connected to the gripper 5 and/or to the base body 28. The designation "rear" relates to the rear position in the conveying direction 11.

The gripping arms each have drives where the front gripping arm has a front drive 12 and the rear gripping arm has a rear drive 13. In the present embodiment, these are driven by the motors 32, 33. The front motor 32 drives the front drive 12 via a transmission and the rear motor 33 drives the rear drive 12 via another transmission. Furthermore, the gripping device has a plurality of guide elements which determine the kinematics or the degrees of freedom and their freedom of movement. Furthermore, a counter-holder 14 is provided in the stacking area 8. This counter-holder is disposed in such a manner that the wafer sheet or the wafer block component is located in the stacking area between the gripper 5 and the counter-holder 14. The counter-holder is disposed in order to counteract the force of the gripper 5 which is directed in the direction of the first transport device 1 in different process sections.

The entire apparatus is located on a machine frame 15 which in turn can be fixed on the rest of the machine or on the floor by means of apparatus not shown.

Furthermore, at least one detector 16 is provided. The detector is connected to a control unit 17 not shown and is used to determine the time of entry of the wafer block component and to synchronise and control the movement of the gripping device 4, in particular the gripper arms 6, 7. Also the gripper, the gripping device, the vacuum pump, the first transport device and/or the drives of the transport arms etc. can be controlled by the control unit 17.

The method for forming wafer blocks takes place in several steps:

wafer sheets are baked in a tong baking oven and supplied to a cooling device. This cooling device conveys the baked, crispy brittle thin flat wafer sheets to a transport device. Subsequently wafer sheets are coated on one side with a coating mass, in particular a cream or several layers of a coating mass. The coating mass is applied in coating devices such as, for example, contact coating devices, roller coating devices, film coating devices or by application by nozzles or similar devices. The wafer sheets coated on one side are subsequently stacked one above the other in order to thus form a multilayer structure. Usually there are wafer blocks having two, three, four, five and more layers of wafer sheets, where respectively one or more layers of a cream are provided between the wafer sheets. Usually the uppermost and the lowermost layer of the wafer block is formed from respectively at least one part of a wafer sheet.

In order to now form a wafer block, a first wafer block component 2 is conveyed through the first transport device 1 into the stacking area 8. The first transport device 1 is configured as a belt conveyor and comprises a driven belt 18 which is returned via a deflecting roller. Further possibilities for conveying the wafer block components are, for example, belt conveyors, roller conveyors etc.

The first wafer block component preferably has a three-layer structure and has two external wafer sheets which are filled with an interposed cream filling. The first wafer block component 2 is now transported at a certain speed by the first transport device into the stacking area. The movably disposed gripper 5 is co-moved in the conveying direction at least shortly before the gripping process at the same speed and is placed from above on the first wafer block component 2. The gripper 5 is thereby pressed by the gripper arms 6, 7 in a rear position onto the first wafer block component 2 lying on the first transport device. The cavities of the gripper 5 are closed by the first wafer block component, where a vacuum can form in the cavities due to the vacuum pump 10 and the connected vacuum line 9. The vacuum results in a holding force via the surface of the sucked-on wafer block component by which means the first wafer block component is held on the plate-shaped gripper 5. It should be noted here that during the process of placement and suction the gripper co-moves with the first transport device and the first wafer block component 2 in the conveying direction 11.

Figure 2A:
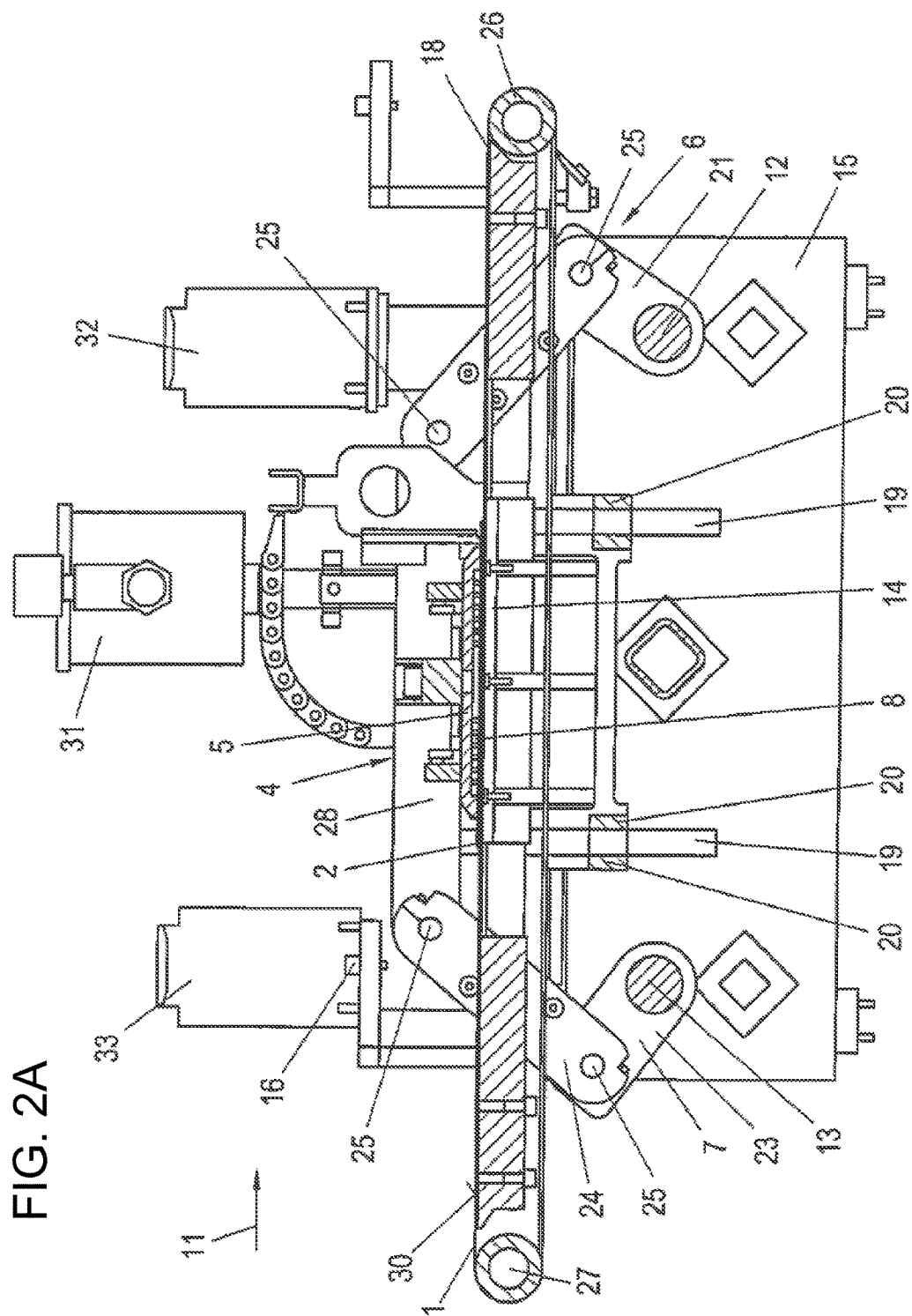
FIGS. 2a-2h are views similar to FIG. 1 showing the apparatus in different operating positions.
Figure 2B:
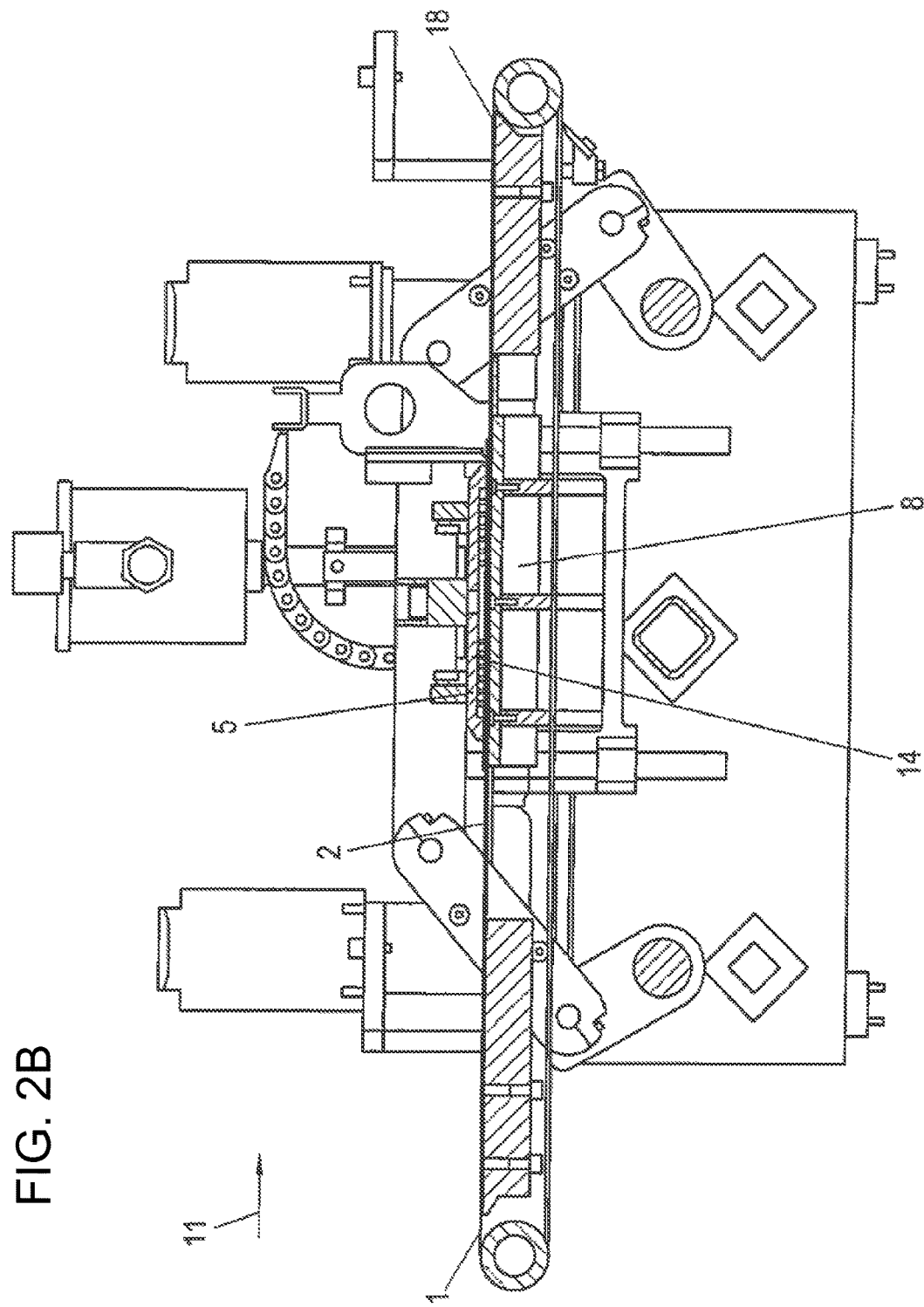
Figure 2C:
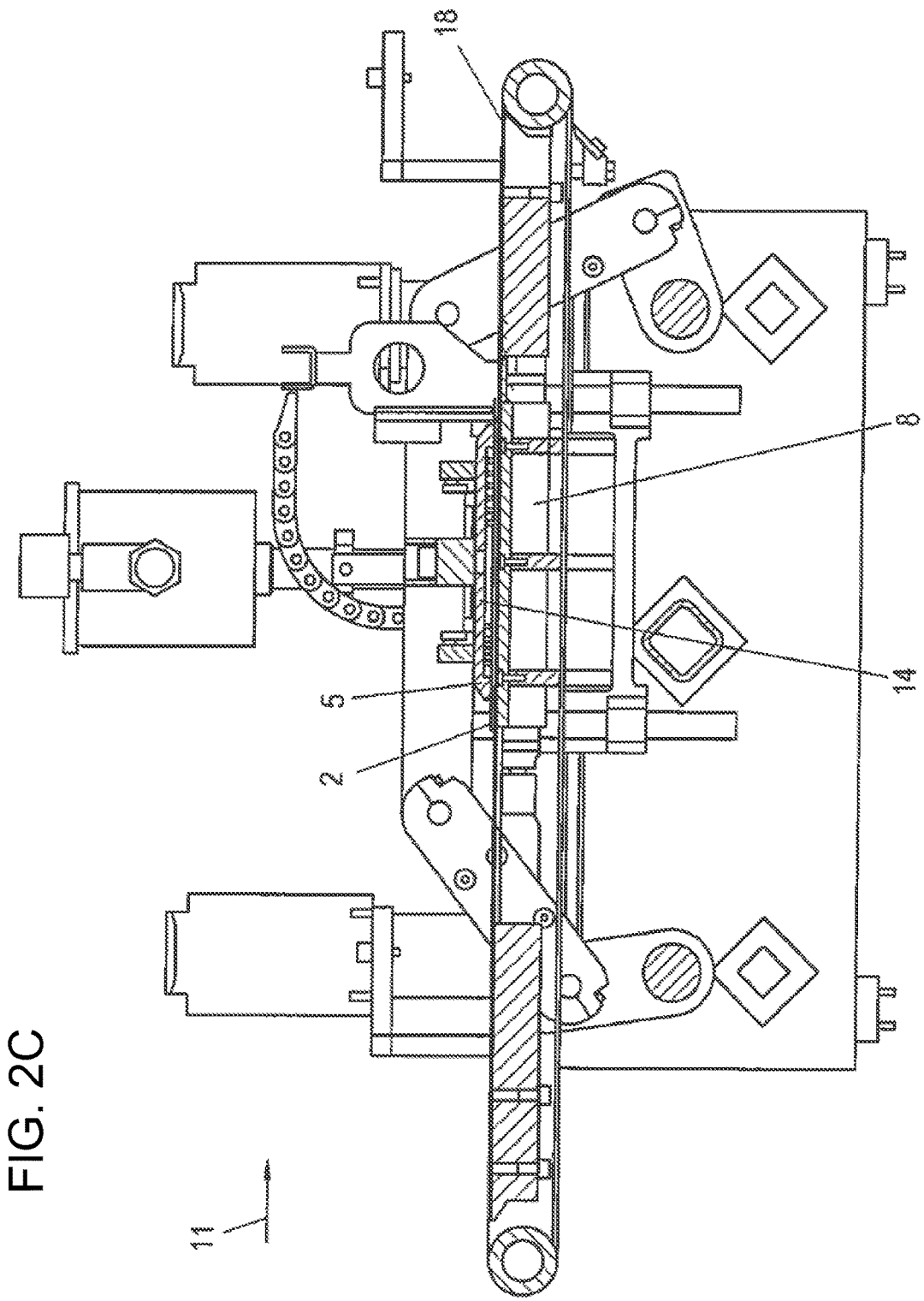
Figure 2D:
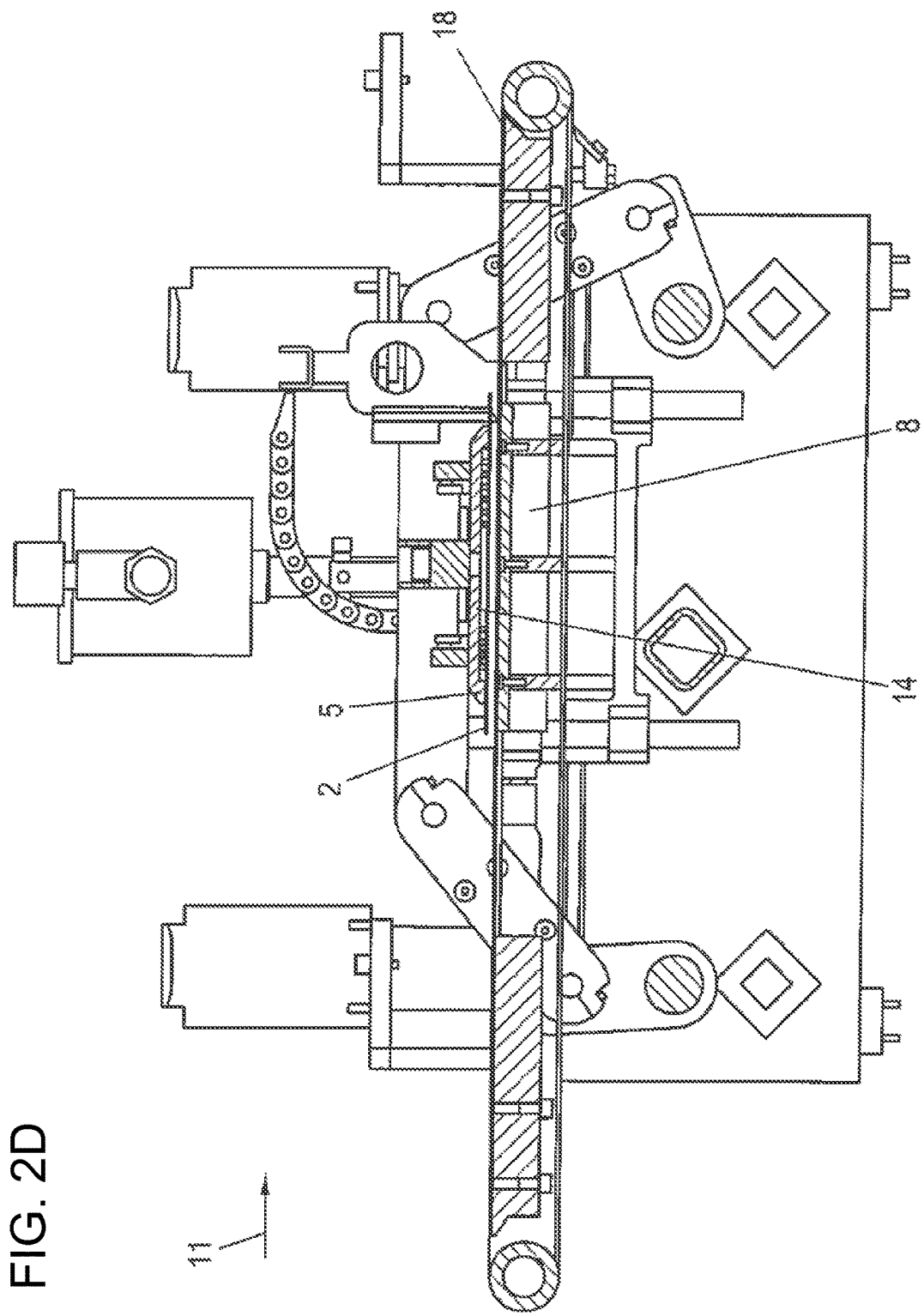

FIG. 2 shows a position of the device according to the invention in which the gripper 5 is placed on the first wafer block component and is moved from a rear position as shown in FIG. 2a into a front position as shown in FIG. 2b. During the movement from the rear into the front position, the gripper can, in addition to the movement in the conveying direction, execute additional movements normal to the conveying direction, in particular in the direction of the first wafer block component 2 and further in the direction of the belt 18. In order to prevent a bending of the belt 18 of the first transport device 1, a counter-holder 14 is provided below the gripper 5. This is disposed displaceably along the conveying direction 11 and the conveying surface 30 but is blocked from any displacement in the vertical direction. If the gripper is now pressed onto the first wafer block component, this subsequently transmits force onto the belt 18 which in turn is supported on the counter-holder 14. The counter-holder is entrained in the same way as the gripper 5 at the speed of the first wafer block component. Preferably no slippage is thus formed between the components gripper 5, first wafer block component 2, belt 18 and counter-holder 14 in the stacking area 8. The entire combination now moves further along the conveying surface 30 as far as the end of the stacking area 8. There, as shown in FIG. 2c the gripper is raised from the belt 18 of the first transport device 1. As a result of the holding force, the first wafer block component 2 is also raised and removed from the belt 18. The movement of the gripper 5 is accomplished by controlling the drives 12, 13 of the gripper arms 6, 7. During this process the speed of the gripper plate substantially differs from the speed of the belt 18 in the conveying direction 11. Subsequently, the gripper 5 is removed from the belt 18 and raised in the vertical direction. This is shown in FIG. 2d.

Figure 2E:
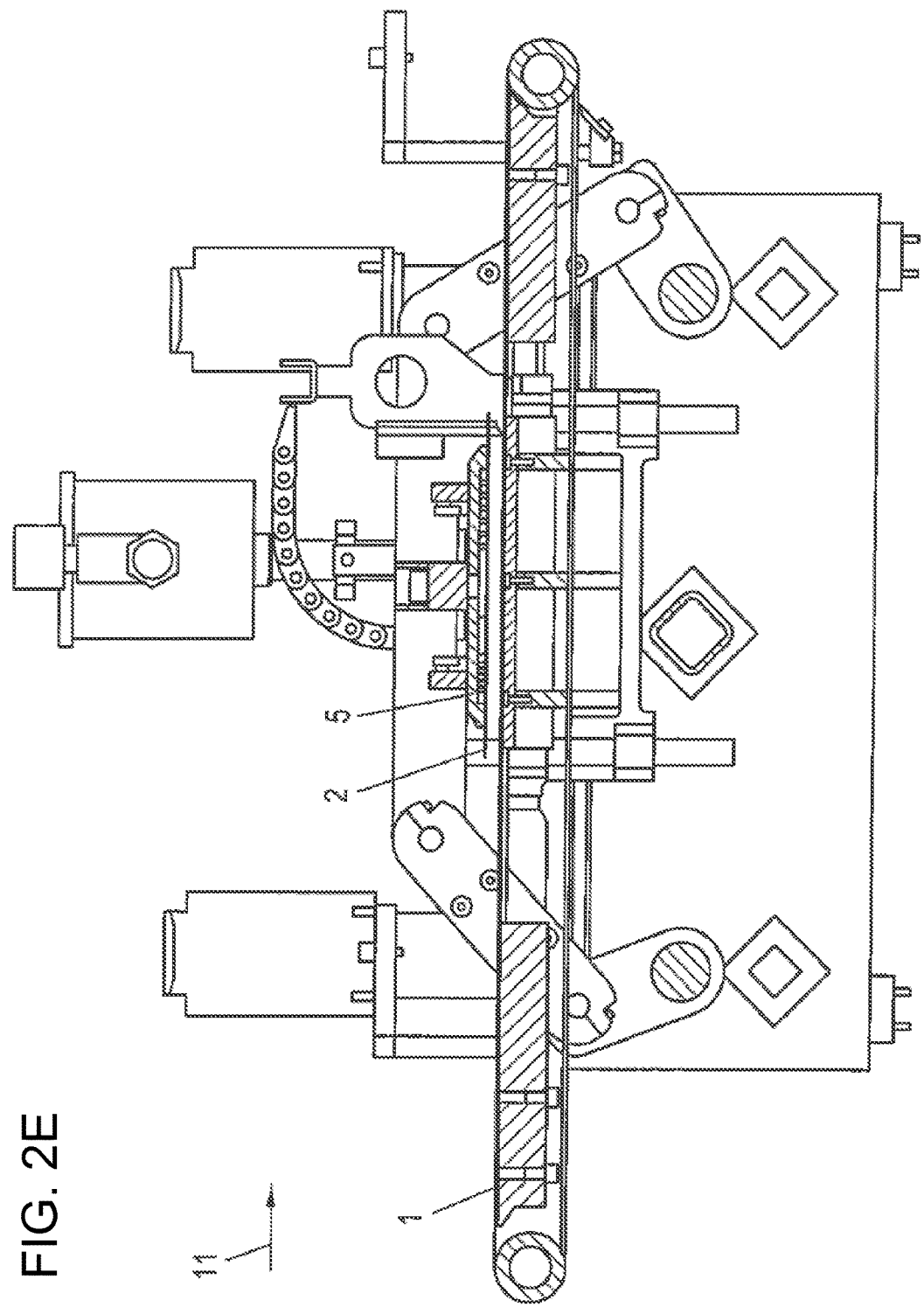
Figure 2F:
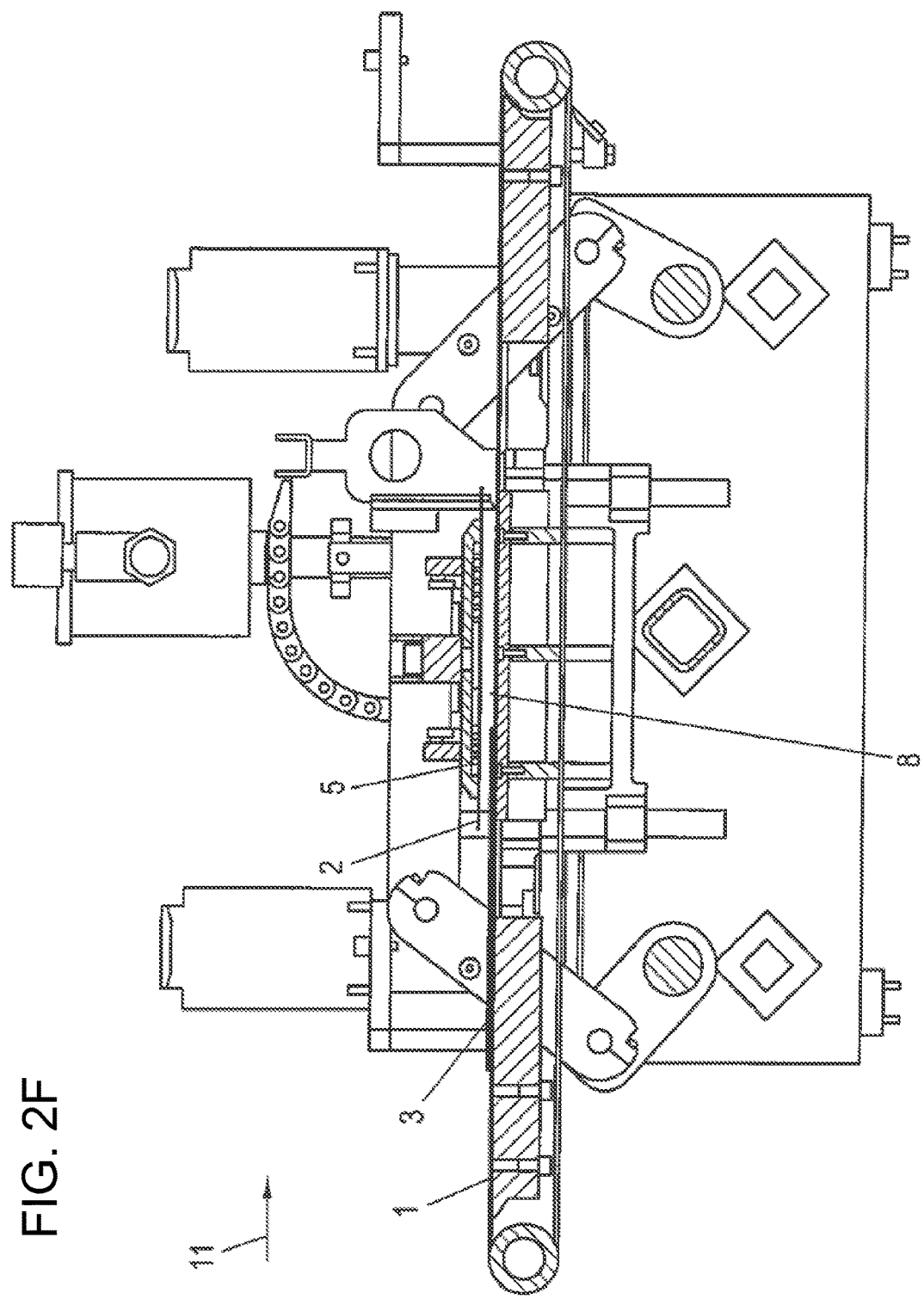

FIG. 2e shows another position in which a movement of the gripper 5 takes place contrary to the conveying direction 11. The gripper 5 is moved by the front gripper arm 6 and the rear gripper arm 7 contrary to the conveying direction 11 and is returned, as shown in FIG. 2f, further in the direction of a rear position. After or during a return movement of the gripper which is shown in FIGS. 2e-2f, a second wafer block component 3 is transported by the first transport device 1 in the direction of the stacking area 8. The first wafer block component 2 and the gripper 5 are raised from the transport device whereby this can supply the second wafer block component 3 unhindered to the stacking area.

Figure 2G:
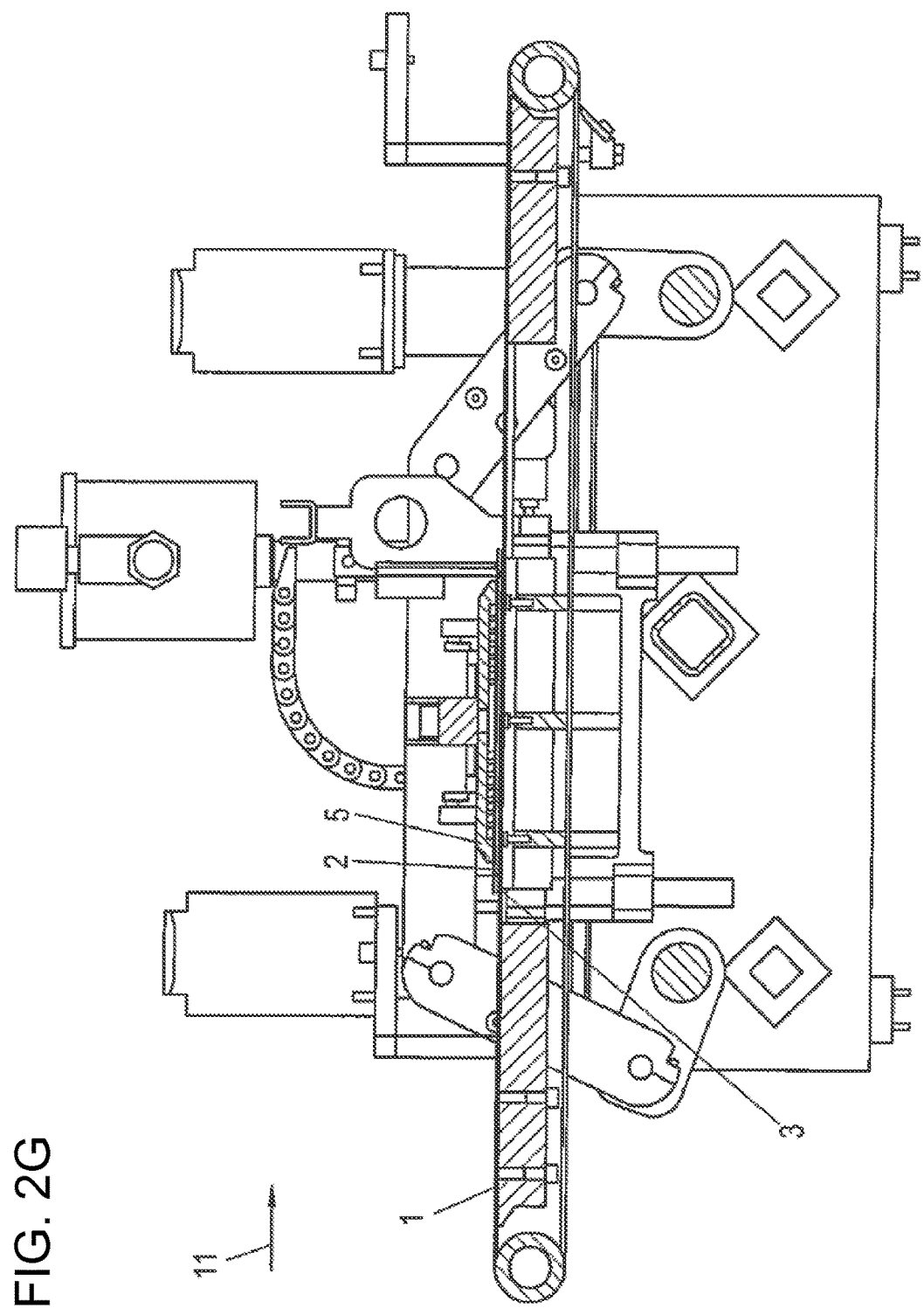

FIG. 2g shows a position close to the rear dead point or the maximum freedom of movement of the gripper 5 in the left direction shown here—i.e. contrary to the conveying direction 11. In this case, the gripper 5 is located above the second wafer block component 3 and is moved parallel to this. The movement or the position of the gripper 5 over the second wafer block component 3 is synchronised via the control unit 17.

Figure 2H:
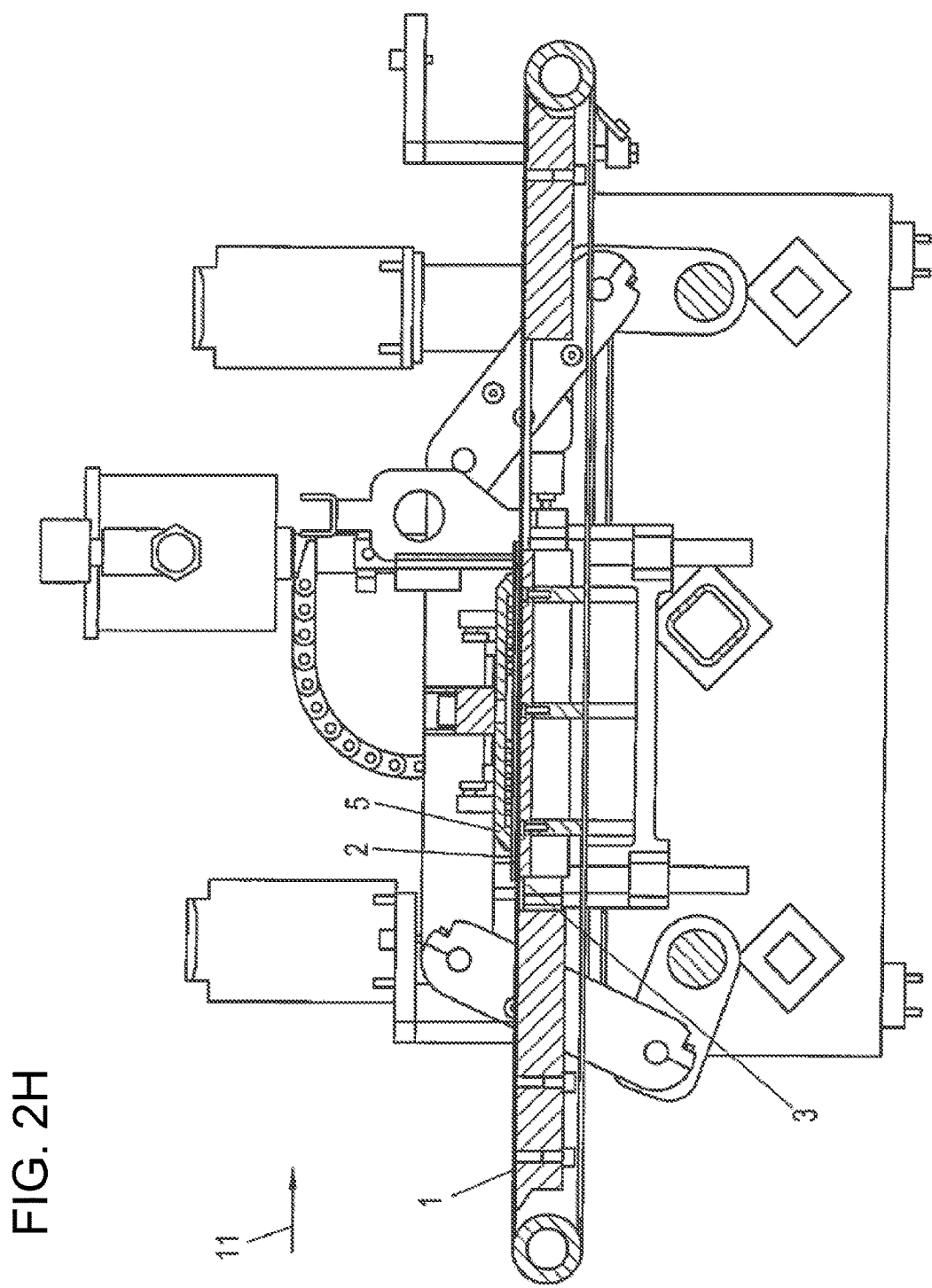

The detector 16, which for example is designed as a light curtain, determines the synchronisation and therefore the exact placement of the first wafer block component 2 on the second wafer block component 3. To this end, the control unit intervenes in the movement of the drives 12, 13 of the gripping arms 6, 7. If the second wafer block component 3 is located in the stacking are 8, as shown in FIG. 2g, the gripper together with adhering first wafer block component 2 is entrained above the second wafer block component 3 at the same speed and subsequently, as shown in FIG. 2h, placed thereon. The second wafer block component is preferably designed in two layers and on its lower side lying on the belt 18 has a wafer sheet and on the side facing the gripper 5 a layer of a cream or a coating mass. In this case, the first wafer block component is pressed exactly congruently on the second wafer block component, whereby a wafer block is formed, which in the present case consists of three layers of wafer sheets with interposed two layers of cream filling.

The gripper is again pressed in the direction of the belt 18. The counter-holder 14 guided in the conveying direction 11 is provided as counter-bearing for the pressure or the resulting force. During this process the gripper 5, the first wafer block component 2, the second wafer block component 3, the upper part of the belt 18 and the counter-holder 14 move at the same speed in the conveying direction 11. During the movement from a rear position into a front position, again in addition to the movement in the conveying direction, a movement normal to the conveying direction can also take place, in particular for pressing the first wafer block component onto the second wafer block component. The placement and pressing process takes place as shown in FIGS. 2a and 2b. At the end of the stacking area 2, the combination of the first wafer block component 2 with the second wafer block component 3 which is joined to the first wafer block component by adhesion of the cream, which in turn adheres to the gripper through the holding force, is raised.

Now the wafer block is raised from the belt and as can be seen in FIGS. 2c to 2g, is returned into a rear position. In the meantime a third wafer block component can be supplied and as the second wafer block component previously, joined to the wafer block components held on the gripper.

At the same time the gripper 5 is moved along a circular contour controlled by the control unit 17. The movement is shown in particular in FIGS. 2a to 2h where this circular movement can be repeated arbitrarily frequently for the stacking of a plurality of wafer components. During the stacking of a plurality of, for example, three wafer block components, a position similar to FIG. 2g would again follow as the next step after the position shown in FIG. 2h. In this case, however, the gripper 5 is positioned a certain amount higher in the vertical direction than in the first passage of the circular movement. This amount substantially corresponds to the height of the wafer block hitherto formed. The positions of FIGS. 2a to 2h accordingly follow one another in a continuously moving process where the sequence of the positions corresponds to the alphabetic sequence of FIGS. 2a to 2h.

For placement of the existing wafer block held on the gripper 5 on another following wafer block component, the gripper and the wafer block located thereon is entrained above the moving subsequent wafer block component and placed in a substantially perpendicular movement with respect to the following wafer block component. Both parts, i.e. the gripper 5 and the wafer block component to be joined move in the direction of the conveying direction 11 at the speed of the first transport device 1. In order to achieve the exact placement of the gripper 5 on the following wafer block component, a detector 16 is provided. This detects the time of entry of the following wafer block component. By means of the speed of the first transport device, the control unit 17 can now synchronize the movement of the gripper 5, in particular of the gripping arms 6, 7. The gripper with the adhering existing wafer block then sits on the following wafer block component and presses this in the stacking area against the belt 18 and subsequently against the counter-holder 14. Due to the plate-shaped configuration of the gripper 5 and the counter-holder 14, the height of the wafer block can be varied in certain areas by the applied pressure. In particular during mass production it is of major importance that the finished product complies with certain dimensional tolerances. For this purpose, the wafer blocks are stacked in order to then be compressed to a standard size. This pressing process in which the plate-shaped gripper 5 is pressed against the counter-holder 14 takes place during a continuous further movement along the conveying direction 11.

During the stacking process the gripper is lowered by a certain amount less in the direction of the belt 18 on each passage as a result of the thickness of the stacked wafer block components. If the desired wafer block thickness or the desired number of layers is reached, the gripper is released from the wafer block. This is then removed subsequently by the first transport device.

Alternatively to this after the first run, i.e. after placement and pressing of the first wafer block component on the second wafer block component, the connection of the gripper 5 with the wafer block can be released. The wafer block can then be removed by means of the first transport device.

Release is accomplished by no longer applying a vacuum to the gripper whereby the holding force disappears and the wafer block is no longer held on the gripper. Preferably this separation takes place when the wafer block lies on the belt 18 of the first transport device 1.

It should be noted that the entire stacking process takes place continuously, i.e. the individual wafer block components need not be stopped on the belt but are raised from this and joined together during a uniform movement.

Figure 3:
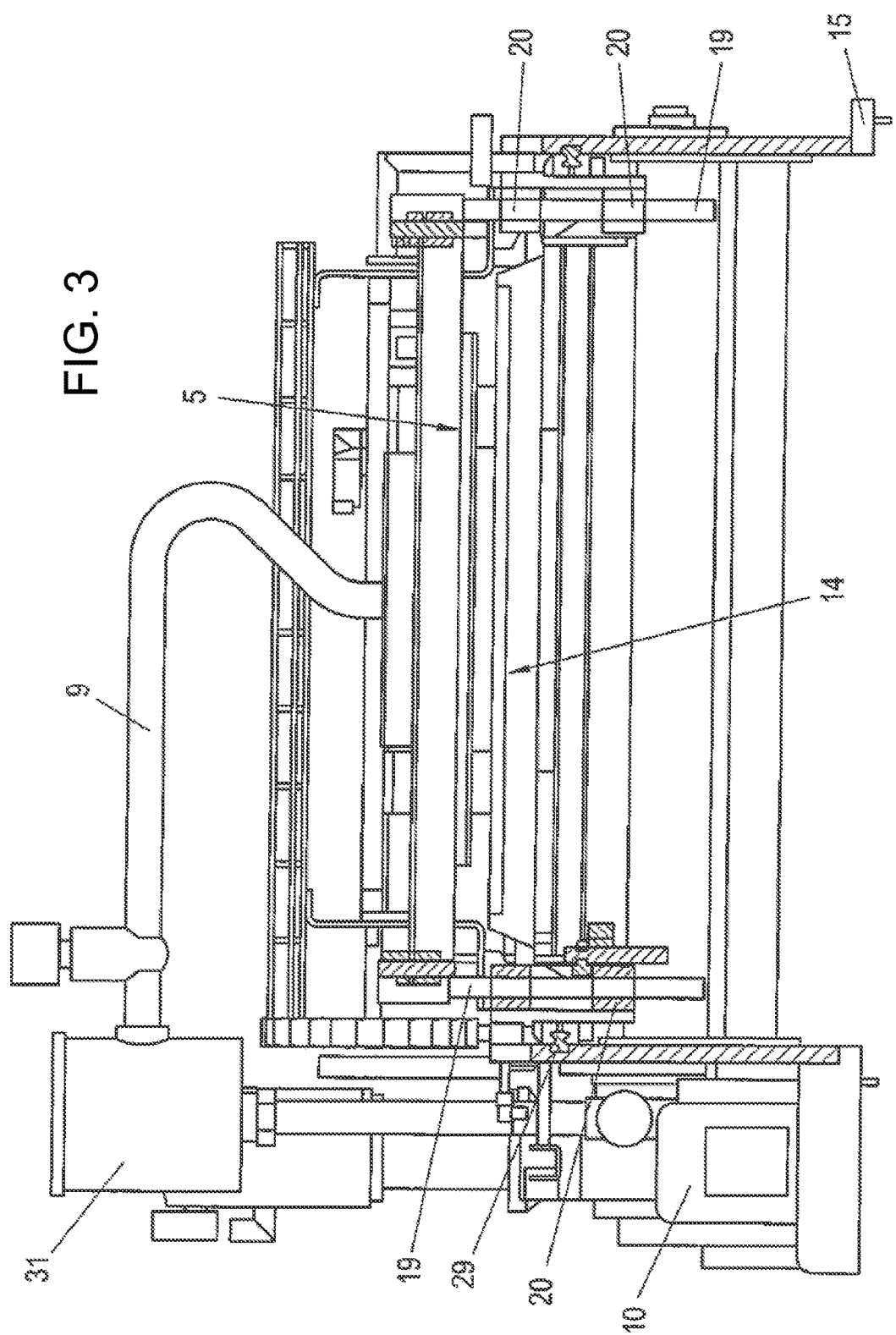
FIG. 3 is a partly broken-away, side-elevational view of the apparatus.

FIG. 3 shows a schematic view of the apparatus according to the invention, where the elements shown are depicted in partially cutaway view. The viewing direction substantially follows the conveying direction 11 from FIG. 1.

The apparatus comprises a gripping device 4 having a gripper 5 and a counter-holder 14. The gripper 5 and the counter-holder 14 exhibit kinematic constraints. The two plates are thus guided parallel to one another. A tilting of one plate with respect to the other is only possible in the region of a small play of the guide elements. This parallel guidance of the gripper 5 and the counter-holder 14 is executed by means of pins 19 and bushings 20. A plurality of bushings 20 is provided on one element in which pins 19 are disposed in a guided and displaceable manner, which are connected to the respective other element. In the present embodiment four pins 19 are firmly connected to the gripper 5 and/or the base body 28 of the gripper. The pins run substantially vertically or normally to the conveying direction 11 and to the principal direction of extension of the plate-shaped gripper 5. The pins 19 project in bushings 20 which are firmly to the counter-holder 14. The bushings have openings into which the pins 19 can be guided. The openings of the bushings are configured in such a manner that only one linear movement of the pin is made possible. The direction of the linear movement substantially corresponds to a normal to the principal direction of extension of the plate-shaped gripper 5. Furthermore, the components vacuum pump 10, air filer 31 and vacuum line 9 are provided to produce the retaining force.

In the present case, the counter-holder 14 is designed as plate-shaped and is arranged linearly displaceably along the conveying direction. In particular, the counter-holder 14 is disposed displaceably in the stacking area 8. Kinematically this means that the counter-holder 14 can only be moved linearly along the conveying direction. The guidance is provided by the arrangement of a linear guide element 29. The gripper 5 in turn can only be moved parallel and linearly to the counter-holder 14. However, the direction of the translational movement of the gripper 5 with respect to the counter-holder 14 is normal to the conveying direction—in the present case vertical—whereas the possible direction of movement and the direction of the translational degree of freedom of the counter-holder 14 follows the conveying direction, i.e. runs horizontally in the present case. The gripper 5 can therefore be moved vertically and horizontally due to the configuration of these kinematics. The movement takes place via the front gripping arm 6 and the rear gripping arm 7, which on the one hand act on the machine frame 15 and on the other hand act on the gripper 5 and/or on the base body 28. It should be noted that respectively two front gripping arms and respectively two rear gripping arms can be provided—as shown for example in FIG. 4.

The front gripping arm 6 comprises a front drive 12. This drive is designed as a rotary drive and has at its centre an axis of rotation about which the first arm 21 is rotatably disposed. The front motor 32 drives the front drive via a transmission. The first arm 21 has on its end facing away from the front drive 12 a rotational bearing 25 by which means it is connected to the second arm 22. This rotational bearing is for example designed as a pin-bushing connection. It allows a rotational movement of the second arm 22 with respect to the first arm 21 about the axis of rotation of the rotational bearing 25. The second arm 25 is in turn connected at its end facing away from the first arm via a rotational bearing 25 to the gripper 5 and/or the base body 28. The connection of the second arm 22 to the gripper 5 also allows the free rotation of the second arm 22 about the rotational bearing 25.

The rear gripping arm is configured likewise and has a rear drive 13 driven by the rear motor 33 which can rotationally drive a third arm 23. On the end facing away from the rear drive 13 this in turn has a rotational bearing 25 by which means it is connected to the fourth arm 24. The fourth arm is rotatably arranged by means of a rotational bearing 25 on the gripper 5 and/or the base body 28. The position of the gripper 5 with respect to the machine frame 15 can be selected within kinematic limits by the controlled drive of the drives 12, 13. The arrangement of the gripping arms corresponds in the widest sense to the kinematic configuration of a piston rod, where in addition to the vertical movement by the two drives a horizontal movement can also be effected. Both drives are controlled by the control unit 17 not shown. The degrees of freedom are now refined in the following to improve the clarity:

The axes of rotation of the front drive 12, the rear drive 13 and all the rotational bearings 25 run projecting in FIG. 1. Likewise the axis of rotation of the drive and the deflecting roller of the first transport device are projecting. The first arm 21 and the second arm 22 have a degree of rotational freedom to one another where the axis of rotation of the rotational degree of freedom corresponds to the axis of rotation of the rotational bearing 25. Likewise the third arm 23 and the fourth arm 24 are disposed rotatably with respect to one another, where the axis of rotation corresponds to the axis of rotation of the rotational bearing 25. The fourth arm and the second arm act on the gripper 5. It should be noted that the arms 22 and 24 do not act directly on the gripper 5 but on a base body 28 connected to the gripper 5. The base body 28 can be rigidly connected to the gripper 5 where the gripper 5 can also be arranged in a spring-mounted manner or movably limited with respect to the base body. The gripper 5 or the base body 28 is arranged in a parallel-guided manner with respect to the counter-holder 14. The base body 28 and the gripper 5 thus have a translational degree of freedom with respect to the counter-holder 14. The counter-holder 14 in turn has a translational degree of freedom which runs substantially orthogonal to the degree of freedom of the gripper 5. The counter-holder is thus disposed translationally displaceably along the conveying direction 11 and runs just below the upper section of the belt 18. The counter-holder 14 is arranged displaceably between the upper side of the belt and the returning lower side of the belt. It accordingly runs directly below the section of the belt in which the wafer block components are conveyed. Preferably due to the control and the movement of the drives 12, 13 the counter-holder 14 is located directly below the wafer block component in the stacking area 8 and follows this along the conveying direction 11.

Figure 4:
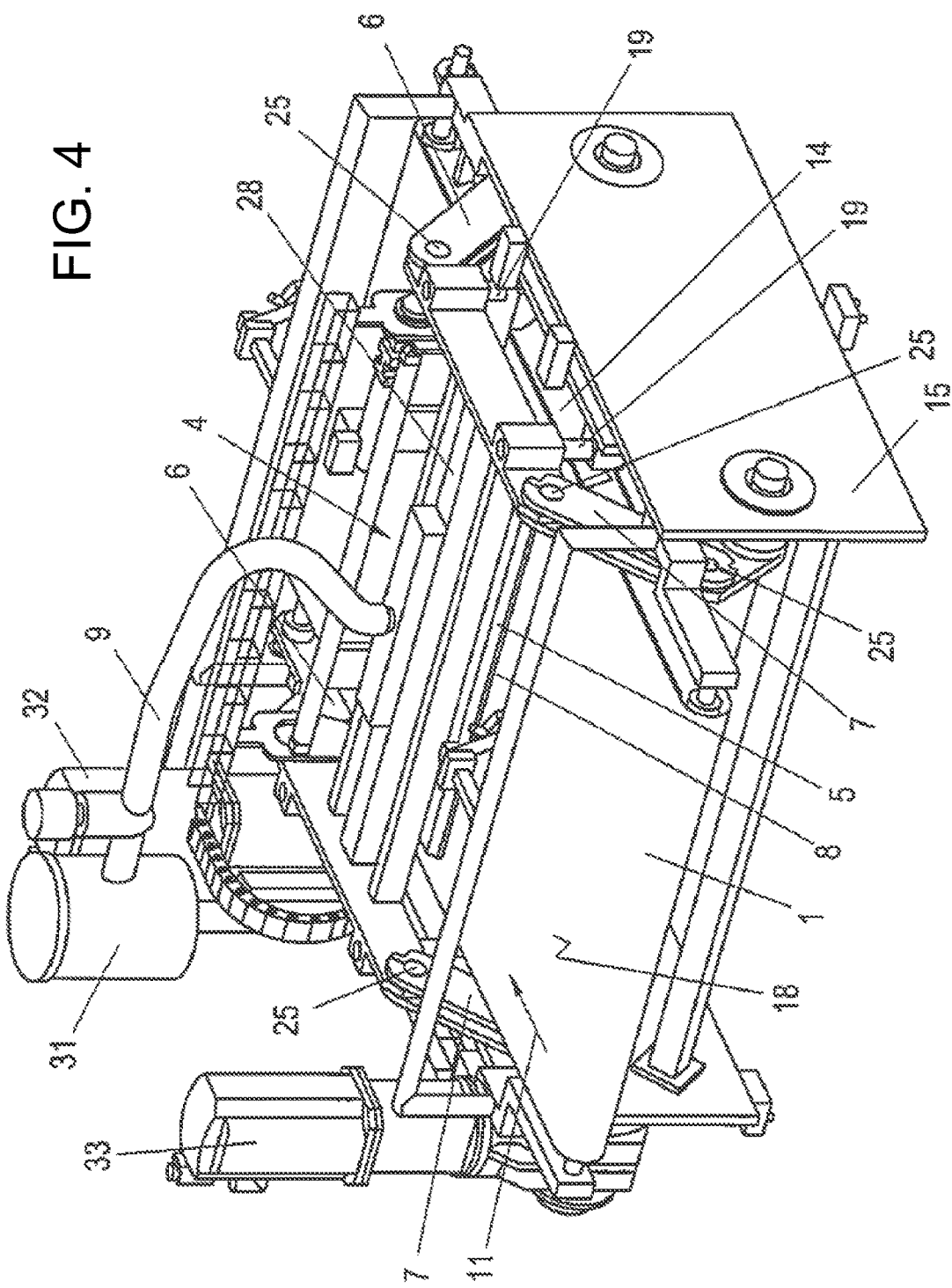
FIG. 4 is a perspective view of the apparatus.

FIG. 4 shows an oblique view of a device according to the invention comprising a first transport device 1, a first wafer block component 2, a gripper device 4 having a gripper 5, two front gripping arms 6 and two rear gripping arms 7 and a base body 28. The gripper 5 moves along an almost closed circular contour where in the lowered region a straight guidance is accomplished in the conveying direction, then a raising movement, a substantially rectilinear back movement and finally again a lowering movement.

Furthermore, a vacuum line 9, a vacuum pump 10, a front drive 12, a rear drive 13 and the counter-holder 14 are provided. Furthermore a detector 16 is disposed rigidly with the machine frame 15, which is connected to a control unit 17 not shown. The belt 18 of the first transport device 1 has a drive 26 and a deflecting roller 27. Furthermore, pins 19 are provided on the base body 28 which are mounted guided in bushings 20 of the counter-holder 14.

At this point, it should be noted that the invention is not restricted to the exemplary embodiments listed. Further embodiments corresponding to the inventive idea are obtained from combinations of individual or several features which can be deduced from the entire description, the figures and/or the claims. Consequently embodiments are also disclosed which consist of combinations of features stemming from different exemplary embodiments. The figures are at least partially schematic views where the dimensions and proportions can deviation from other embodiment or features not depicted in the drawings and from real embodiments.

REFERENCE LIST

1 First transport device
2 First wafer block component
3 Second wafer block component
4 Gripping device
5 Gripper plate
6 Front gripping arm
7 Rear gripping arm
8 Stacking area
9 Vacuum line
10 Vacuum pump
11 Conveying direction
12 Front drive
13 Rear drive
14 Counter-holder
15 Machine frame
16 Detector
17 Control unit
18 Belt
19 Pin
20 Bushing
21 First arm
22 Second arm
23 Third arm
24 Fourth arm
25 Rotational bearing
26 Drive first transport elements
27 Deflecting roller
28 Base body
29 Linear guide element
30 Conveying surface
31 Air filter
32 Front motor
33 Rear motor

The invention claimed is:

1. An apparatus for producing multilayer wafer blocks filled with a coating mass such as a cream, the apparatus comprising:
a conveying surface defining a conveying direction;
a first transport device configured to transport wafer block components along said conveying surface in said conveying direction;
a gripping device configured to stack the wafer block components, said gripping device having a gripper disposed movably at least in sections along said conveying surface; and
a counter-holder configured to hold the wafer block components against said gripper, said counter-holder being disposed displaceably along said conveying surface in and counter to said conveying direction.

2. The apparatus according to claim 1, wherein said gripper is configured to move at least along two translational degrees of freedom.

3. The apparatus according to claim 1, which further comprises at least one gripping arm configured to move said gripper.

4. The apparatus according to claim 3, wherein said at least one gripping arm is a plurality of gripping arms each having at least one respective drive.

5. The apparatus according to claim 1, wherein said gripper is disposed displaceably substantially normal to said counter-holder.

6. The apparatus according to claim 1, wherein said gripper is disposed displaceably in a translational manner substantially parallel to said counter-holder.

7. The apparatus according to claim 1, wherein said gripper is a vacuum plate having openings configured to be closed at least partially by a first wafer block component.

* * * * *